Feb. 15, 1966 J. W. LUEBBE, JR 3,235,853

CONTROL APPARATUS

Filed April 12, 1962 2 Sheets-Sheet 1

INVENTOR.
JOHN W. LUEBBE, JR.

BY Roger W. Jensen

ATTORNEY.

Feb. 15, 1966 J. W. LUEBBE, JR 3,235,853

CONTROL APPARATUS

Filed April 12, 1962 2 Sheets-Sheet 2

INVENTOR.
JOHN W. LUEBBE, JR.

BY Roger W. Hensen

ATTORNEY.

United States Patent Office 3,235,853
Patented Feb. 15, 1966

3,235,853
CONTROL APPARATUS
John W. Luebbe, Jr., Clearwater, Fla., assignor to Honeywell Inc., a corporation of Delaware
Filed Apr. 12, 1962, Ser. No. 186,961
8 Claims. (Cl. 340—174)

This invention relates to control apparatus and more particularly to computer memory circuits operating in a non-destructive readout mode.

Non-destructive readout memory techniques are well known in the art; a discussion of this type of memory can be found in an article entitled "Fluxlok—A Nondestructive, Random-Access Electrically Alterable, High-Speed Memory Technique Using Standard Ferrite Memory Cores," by Robert M. Tillmen, in the September 1960 issue of the IRE Transactions on Electronic Computers.

As is well-known in the art, fluxlok, and similar non-destructive readout memory devices, produce relatively small output signals. The present invention provides a means for increasing the output signals from these types of memories.

This invention comprises, in a broad sense, a computer memory having a plurality of storage units, each of the storage units comprising a plurality of non-destructive readout magnetic devices, such as a toroidal magnetic core constructed to operate in the non-destructive readout mode. The various storage units each may be designated as a memory word, with each bit of the word being represented by one of the non-destructive readout magnetic devices.

Separate interrogate windings are connected to the magnetic devices of each memory word.

Separate sense, or readout, windings are connected to all the like order magnetic devices in the memory words, and the output of each of the sense windings is adapted to be connected to a read amplifier.

The various interrogate windings are adapted to be connected to a suitable source of interrogate pulses so that each of the interrogate windings, when energized by an interrogate pulse, generates a flux field. The generated flux field produces rotation of the magnetic moments in the cores associated with the interrogate winding. The moments in each interrogated core now complete their flux paths through air and there is a net change in the flux within the cores. The change in flux in each of the interrogated cores induces an output signal in the sense winding linking each core. The magnitude of the output signal on the sense winding varies directly with the strength of the interrogate winding field.

Associated with each of the interrogate windings is a high permeability material. This high permeability material provides a low reluctance path for substantially all of the interrogate flux field not linking the magnetic cores, and hence increases the strength of the interrogate flux field. Since the strength of the interrogate flux field is increased the strength of the output signal induced in each of the sensed windings is also increased. The high permeability material provides an additional advantage in that the magnetic field generated by the interrogate windings is restricted to the area immediately near the core which minimizes noise generated by stray fields.

It is one object of this invention to provide an improved memory device.

Another object of this invention is to provide an improved memory device having an increased output signal.

A further object of this invention is to provide an improved memory device wherein a high permeability material is used to increase the flux field generated by an interrogate winding.

These and other objects of my invention will become apparent to those skilled in the art upon consideration of the accompanying specification, claims and drawings of which:

Figure 1:
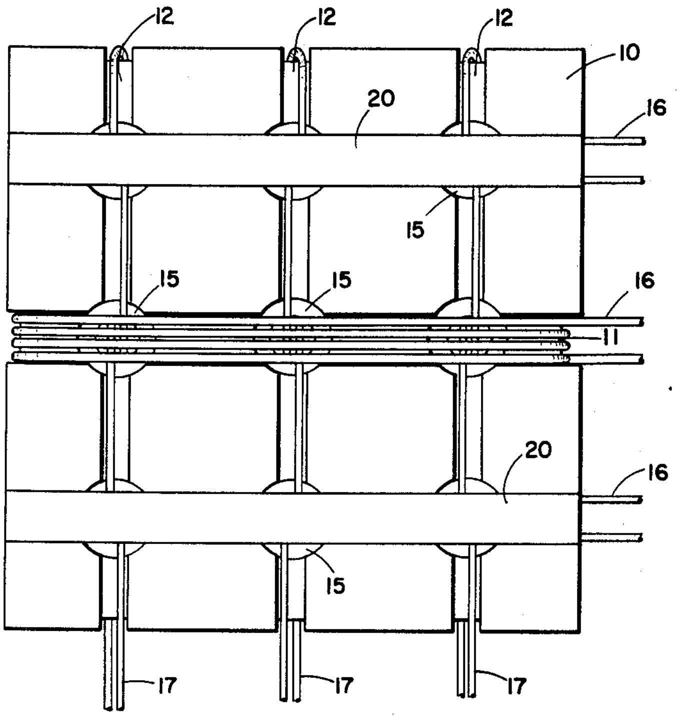
FIGURE 1 is a drawing of a first embodiment of this invention.

Referring to FIGURE 1, there is shown a mounting board, or plate, 10 having a first plurality of substantially parallel grooves 11 and a second plurality of substantially parallel grooves 12 across the surface thereof, the second plurality of grooves intersecting the first plurality of grooves at substantially right angles.

It should be understood that the opposite surface of plate 10 has a pattern of grooves substantially identical with the pattern on the surface described, and that the corresponding grooves in the patterns on each side of the board are substantially aligned.

The plurality of grooves 11 may be considered to be arranged to form rows in the plate 10, while the plurality of grooves 12 may be considered to be arranged to form columns in the plate.

A plurality of interrogate windings 16 are wound around board 10, one of the interrogate windings lying in each of the grooves 11. A memory word comprises the cores associated with a particular interrogate winding.

A sense winding 17 is threaded through like ordered cores of the memory words, one sense winding in each of the grooves 12.

A high permeability material 20, such as a high permeability metal strip, is mounted in each of the grooves 11 on top of the interrogate windings. In order to more clearly show the interrogate winding 16, the high permeability metal strip is not shown in the center groove 11. It should be understood that similar high permeability metal strips 20 are placed in the corresponding grooves 11 on the opposite surface of plate 10.

Figure 2:
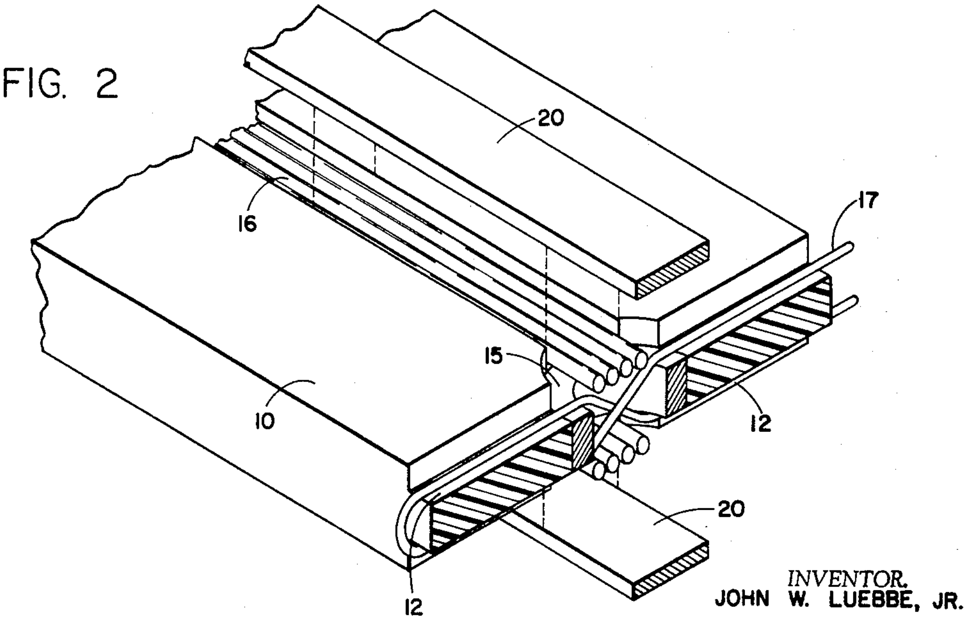
FIGURE 2 is a cut-away isometric view of a portion of FIGURE 1.

The construction of the present invention can be more clearly understood by reference to FIGURE 2. FIGURE 2 shows a sectioned, isometric view of a portion of FIGURE 1.

Referring to FIGURE 2 there is shown the plate 10 having the groove 11 and the groove 12 across its surface, groove 12 being substantially perpendicular to groove 11. Toroidal magnetic core 15 is mounted in the passageway through the plate at the intersections of grooves 11 and 12. Interrogate winding 16 is wound around plate 10 and lies in groove 11. The sense winding 17 threads the core 15 as follows: the sense winding enters board 10 and lies in the upper portion of groove 12, then passes through the aperture of core 15 and continues along a portion of the bottom groove 12, is wound around the end of the board and continues in the upper groove 12, again passes through the aperture of core 15, and leaves the board lying in the bottom portion of groove 12. The high permeability magnetic strips 20, shown in FIGURE 2 in exploded view, fit down into the grooves 11 over the top of interrogate windings 16.

*Operation*

The theoretical operation of the fluxlok memory is thoroughly described in the above-mentioned Tillmen article and will not be repeated in detail here.

In order to interrogate the memory cores, a current pulse is applied to the interrogate winding 16. The current flow through interrogate winding 16 causes a magnetic field to be generated around the interrogate winding. This magnetic field changes the magnetic moment orientation of core 15 and causes the magnetic moments to complete their flux path through air. This results in a net change in the flux from the core and hence a signal is induced in the sense winding 17 linking core 15. It will be noted that without the application of the high permeability material 20, the magnetic field generated by interrogate winding 16 is completed through air, except for the portion of the field linking magnetic core 15. However, when the high permeability metal strips 20 are placed in grooves 11 on top of solenoid winding 16 the majority of the magnetic field generated by interrogate winding 16 is completed through this high permeability material. This results in an increase in the strength of the magnetic field generated by the interrogate winding and hence results in an increase in the strength of the output signal induced in the sensed winding 17, since the magnitude of the output signal varies directly with the strength of the interrogate field, as explained in the above mentioned Tillmen article.

Figure 3:
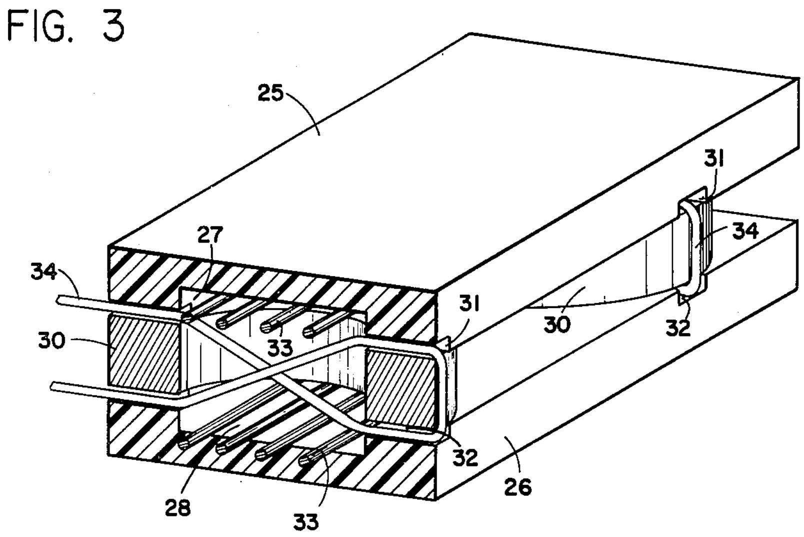
FIGURE 3 is a drawing of a second embodiment of this invention.

FIGURE 3 shows a second embodiment of the present invention. Referring to FIGURE 3 there is shown a first ferrite bar 25 and a second ferrite bar 26. Ferrite bar 25 has a groove 27 along its longitudinal axis. Similarly, ferrite bar 26 has a groove 28 along its longitudinal axis.

A plurality of toroidal magnetic cores 30 are mounted between ferrite plates 25 and 26 so that the grooves 27 and 28, of plates 25 and 26 respectively, are adjacent to the apertures of cores 30.

A plurality of transverse grooves 31, in the surface of plate 25, intersect the longitudinal groove 27, one of the grooves 31 intersecting groove 27 adjacent to the aperture of each of the cores 30.

Similarly, a plurality of transverse grooves 32, in the surface of plate 26, intersect longitudinal groove 28, one of the grooves 32 intersecting groove 28 adjacent to the aperture of each of the cores 30.

An interrogate winding 33 is wound around the plurality of magnetic cores 31, interrogate winding 33 lying in grooves 27 and 28 of plates 25 and 26 respectively. One of a plurality of sensing windings 34 thread each of the magnetic cores 30, the sensing winding lying in transverse grooves 31 and 32 and passing through the aperture of the magnetic core.

The operation of the circuit shown in the embodiment of FIGURE 3 is substantially the same as for the circuit of FIGURE 1 with the exception that in the circuit of FIGURE 3 the ferrite bar itself acts as the high permeability flux path for the field generated by the interrogate winding.

Figure 4:
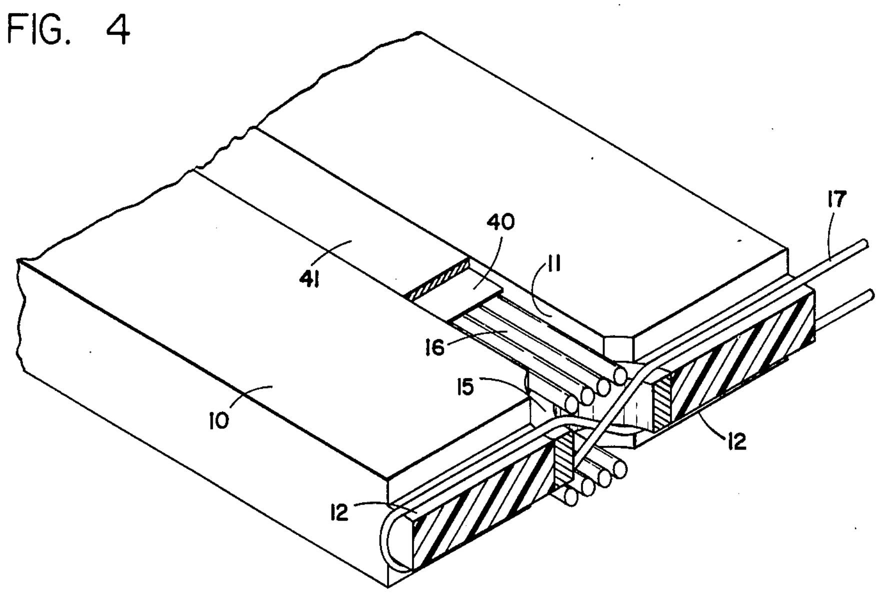
FIGURE 4 is a drawing of a third embodiment of this invention.

FIGURE 4 shows another embodiment of the present invention. The structure of FIGURE 4 is substantially the same as the structure shown in FIGURES 1 and 2 and similar elements have like numerical designations.

Referring to FIGURE 4 there is shown a non-conducting tape material 40 lying in groove 11 and covering the interrogate winding 16. A high permeability mixture 41, comprising a plastic material and high permeability particles is "buttered" over the tape 40 and fills groove 11. Any suitable plastic material, for example an epoxy, may be used in the mixture. Similarly, any suitable high permeability particles, such as iron filings, may be used to complete the mixture. Mixture 41 acts as the high permeability material and replaces the metal strips 20 shown in FIGURES 1 and 2. The theory of operation for the circuit of FIGURE 4 is the same as that for the circuits of 1 and 2, with the exception that in the circuit of FIGURE 4 the flux path for the field generated by the interrogate winding is completed through the high permeability mixture rather than through the metal strips.

It is to be understood that while I have shown specific embodiments of my invention, that this is for the purpose of illustration only, and that I intend that my invention shall be limited only by the scope of the appended claims.

What I claim is:

1. A memory device comprising:
a plurality of magnetic cores;
an interrogate winding linking each of said cores for connection to a source of interrogate pulses whereby said interrogate winding, when energized by an interrogate pulse, generates a flux field;
a plurality of sensing windings, each of said sensing windings respectively linking one of said plurality of magnetic cores;
and a high permeability material associated with said interrogate winding so that said flux field is completed through said high permeability material, thereby increasing the flux generated by said interrogate winding.

2. A memory device comprising:
a magnetic core;
an interrogate winding linking said core for connection to a source of interrogate pulses whereby said interrogate winding, when interrogated by an interrogate pulse, generates a flux field;
a sensing winding linking said magnetic core;
and a high permeability material associated with said interrogate winding so that said flux field is completed through said high permeability material thereby increasing the flux generated by said interrogate winding.

3. A memory device comprising:
a plurality of magnetic cores arranged to form a plurality of memory words, each word having a specific number of bits;
a plurality of interrogate windings, each of said interrogate windings being connected to one of said memory words for connection to a source of interrogate pulses whereby each of said interrogate windings, when interrogated by an interrogate pulse, generates a flux field;
a plurality of sensing means, one of said sensing means respectively linking the same numbered bit cores in each of said memory words;
and a plurality of high permeability materials, one of said plurality of high permeability materials being associated with each of said interrogate windings so that said flux field is completed through said high permeability material thereby increasing the flux generated by said interrogate winding.

4. A memory device comprising:
a plate;
a first pair of aligned grooves in opposite surfaces of said plate;
a second pair of aligned grooves in opposite surfaces of said plate, said second pair of grooves intersecting said first pair of grooves;
a passageway through said plate at the intersection of said first and second pairs of grooves;
a toroidal magnetic core mounted in said passageway;
a first winding wound around said plate and lying in said first pair of grooves;
a second winding lying in said second pair of grooves and passing through said passageway;
and high permeability material means lying in said first pair of grooves and covering said first winding.

5. A memory device comprising:
a plate;
a first plurality of pairs of aligned grooves in opposite surfaces of said plate;
a second plurality of pairs of aligned grooves in opposite surfaces of said plate, said second plurality of pairs of grooves intersecting said first plurality of pairs of grooves;
a plurality of passageways through said plate, one of said passageways being located at each of the intersections of said first and second plurality of pairs of grooves;

a plurality of toroidal magnetic cores, one of said cores being mounted in each of said passageways;
a plurality of first windings wound around said plate, one of said plurality of first windings lying in each of said first plurality of pairs of grooves;
a plurality of second windings, one of said plurality of second windings lying in each of said second plurality of pairs of grooves and passing through each of the passageways associated with each respective pair of grooves;
and high permeability material means lying in each of said plurality of first pairs of grooves and respectively covering each of said plurality of first windings.

6. A memory device comprising:
a plate;
a first plurality of pairs of grooves in opposite surfaces of said plate, the first plurality of grooves arranged to form rows in said plate;
a second plurality of pairs of grooves in opposite surfaces of said plate, said second plurality of pairs of grooves intersecting said rows and arranged to form columns in said plate;
a plurality of passageways through said plate, one of said passageways being located at each of the intersections of said rows and columns;
a plurality of toroidal magnetic cores, one of said cores being mounted in each of said passageways;
a plurality of first windings wound around said plate, one of said plurality of first windings lying in each of said rows;
a plurality of second windings, one of said plurality of second windings lying in each of said columns and passing through each of the passageways associated with the column;
and high permeability material means lying in each of said rows and respectively covering each of said plurality of first windings.

7. A memory device comprising:
a first and a second ferrite member;
a first groove in the surface of each of said members;
a second groove in the surface of each of said members, said second groove intersecting said first groove;
a toroidal magnetic core mounted between said first and second members so that the intersections of said first and second grooves in each member are substantially coaxial with the center line of the toroidal aperture;
a first winding lying in the first grooves of said first and second members and encircling said core;
and a second winding lying in the second grooves of said first and second members and passing through the aperture of said core.

8. A memory device comprising:
a plate;
a first pair of aligned grooves in opposite surfaces of said plate;
a second pair of aligned grooves in opposite surfaces of said plate, said second pair of grooves intersecting said first pair of grooves;
a passageway through said plate at the intersection of said first and second pairs of grooves;
a toroidal magnetic core mounted in said passageway;
a first winding wound around said plate and lying in said first pair of grooves;
a second winding lying in said second pair of grooves and passing through said passageway;
non-conducting tape means lying in said first pair of grooves and covering said first winding;
and high permeability material means comprising a mixture of a plastic material and high permeability particles, lying in said first pair of grooves and covering said non-conducting tape.

References Cited by the Examiner

UNITED STATES PATENTS

| | | | |
|---|---|---|---|
| 2,825,891 | 3/1958 | Duinker | 340—174 |
| 2,907,988 | 10/1959 | Duinker | 340—174 |
| 2,911,627 | 11/1959 | Kilburn et al. | 340—174 |
| 2,978,681 | 4/1961 | Sims et al. | 340—174 |
| 3,102,999 | 9/1963 | Bernemyr et al. | 340—174 |
| 3,133,271 | 5/1964 | Clemons | 340—174 |

IRVING L. SRAGOW, *Primary Examiner.*

BERNARD KONICK, *Examiner.*